United States Patent [19]
Johnsen

[11] 3,909,501
[45] Sept. 30, 1975

[54] HOLLOW CONDUCTOR POWER CABLE

[75] Inventor: John Normann Johnsen, Oslo, Norway

[73] Assignee: International Standard Electric Corporation, New York, N.Y.

[22] Filed: May 9, 1974

[21] Appl. No.: 468,628

[30] Foreign Application Priority Data
May 22, 1973 Norway.............................. 2097/73

[52] U.S. Cl................................. 174/15 C; 174/130
[51] Int. Cl......................... H01b 7/34; H01b 5/10
[58] Field of Search...... 174/15 C, 128, 130, 131 R, 174/131 A; 165/147

[56] References Cited
UNITED STATES PATENTS

| | | | |
|---|---|---|---|
| 3,333,123 | 7/1967 | Baumann..................... | 165/147 UX |
| 3,373,802 | 3/1968 | Wiklund et al................ | 165/147 X |
| 3,662,716 | 5/1972 | Stevens........................ | 165/147 X |
| 3,666,879 | 5/1972 | Hirsch.......................... | 174/130 X |

FOREIGN PATENTS OR APPLICATIONS

| | | | |
|---|---|---|---|
| 958,418 | 5/1964 | United Kingdom............... | 174/15 C |
| 862,654 | 3/1961 | United Kingdom............... | 174/15 C |

OTHER PUBLICATIONS

Advantages of 400KV Internally Oil–Cooled Cable Electrical Times, Vol. 158, No. 12, Sept. 1970.

*Primary Examiner*—Arthur T. Grimley
*Attorney, Agent, or Firm*—John T. O'Halloran; Menotti J. Lombardi, Jr.; Edward Goldberg

[57] ABSTRACT

The conductor cross-section of hollow power cable is changed in accordance with varying heat conductivity conditions along the line. The hollow inner section is decreased in diameter by adding conducting material to provide increased internal heat conductivity in areas of low external heat conductivity. The outer diameter remains constant. One variation uses a smaller diameter helical conductor to support added outer wire conductors. Another type uses an inner perforated pipe of different diameters and added layers of profiled wire conductors. The transition is graded to avoid sudden changes. The hollow inner duct may be filled with a coolant such as oil.

9 Claims, 10 Drawing Figures

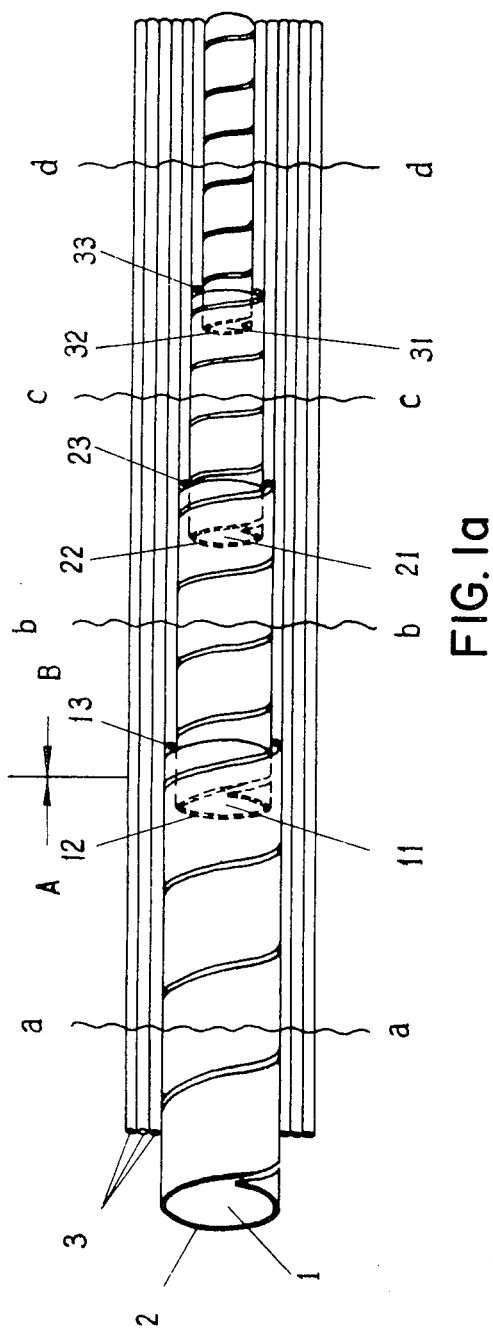
FIG. 1a
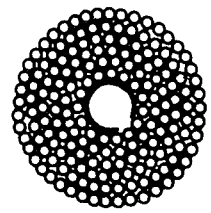
FIG. 1c  d-d
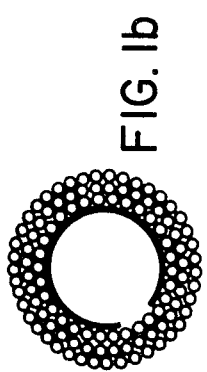
FIG. 1b  a-a

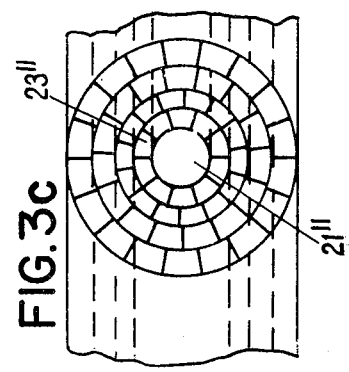
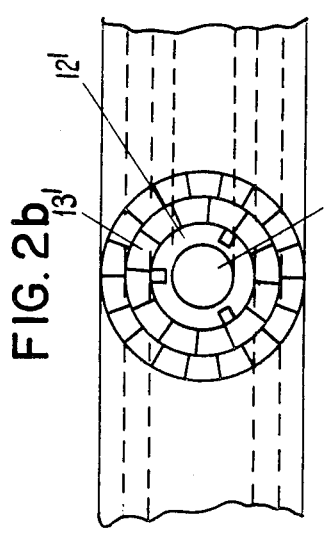
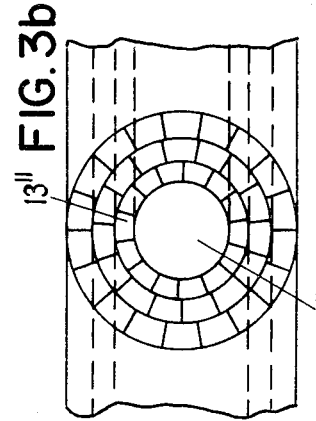
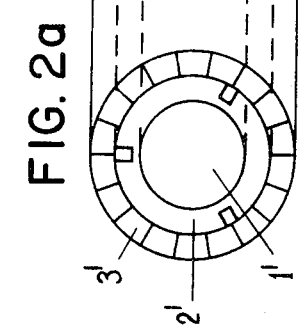
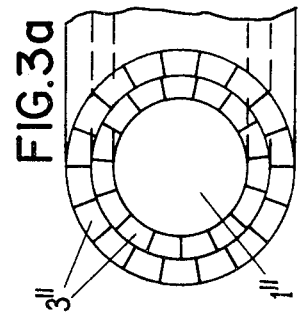
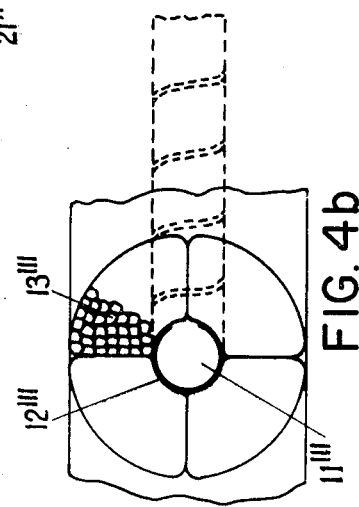
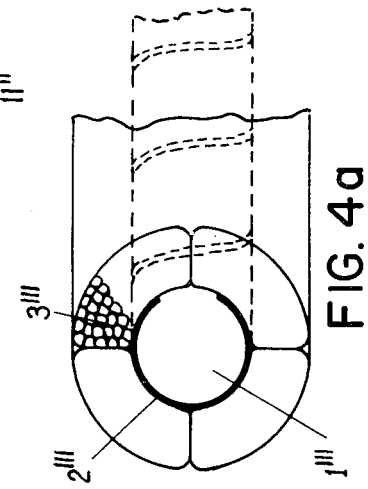

HOLLOW CONDUCTOR POWER CABLE

BACKGROUND OF THE INVENTION

1. Field of the Invention

The present invention relates to power cables with hollow conductors, and particularly to the variation of conductor cross-section in local areas having different heat conductivities relative to that of the cable route in general. It is useful with single conductor oil filled cables provided with hollow conductors insulated with paper impregnated with a low viscosity oil. By means of expansion vessels or pumps, the oil is maintained at a pressure higher than the atmospheric pressure, in order to improve the dielectric strength of the insulation. The invention, however, is not limited to single conductor oil filled cables, as under certain conditions it also may be used with advantage for other types of cables.

2. Description of the Prior Art

It is well known that the current carrying capacity of a cable is determined partly by looses occurring during operation. These include heat losses in the conductor due to the current, ($I^2R$, where I is the current and R is the electrical resistance), dielectric losses in the insulation, possible heat losses due to induced current in the metallic sheath, screen or armouring, and other types of losses, such as eddy current losses in conductor, sheath or armouring, or hysteresis losses in possible magnetic material. In addition, there are losses due to heat conductivity conditions of the cables as well as of its surroundings and the maximum allowable temperature of the cable. This temperature is usually determined by the ability of the insulation to withstand high temperatures over a certain time period. The maximum temperature of a cable will usually be at the conductor and the part of the insulation which is closest to the conductor is therefore the most critical point seen from a thermal point of view. This part of the insulation is also usually the most critical electrical part, as the highest electrical field strength is observed in the insulation close to the conductor.

The life of a cable is largely dependent of the maximum temperature of the insulation. It is known that for the temperature ranges in question, the lifetime of the insulation is reduced to about one half, when the temperature is increased continuously by 8°–10°C. A cable is not stronger than its weakest part, and it is therefore important that the temperature at any place in the cable during normal operation does not exceed certain limits. Limiting temperatures varies from cable type to cable type, normally determined by the type of insulation. These limits may be called the economical limiting temperatures, and these are in regulations and specifications usually defined as the maximum allowable temperature for the insulation material in question. If the cables are operated at temperatures above these limits, the lifetime will be shorter than the most economical lifetime. If they are operated at lower temperatures during full load, this means that the cable is poorly utilized and the operation will therefore by uneconomical. The ideal operation of the cables, in view of these considerations, is that the temperature at maximum allowable load is as close as possible to the maximum allowable temperature for the whole length of the cable.

It is common practice to design a cable, such that the cross-section of the conductor and thereby its electrical resistance is the same over the whole length of the cable. The heat produced in the conductor will thereby also be the same along the cable. The heat conductivity conditions along a cable may, however, vary, and it may often be the case that the heat conductivity at local areas is rather poor, relative to the heat conductivity of the cable route in general. This will usually be the case at joints, due to the fact that the insulation thickness at such joints is greater than in the cable. This will also be the case for submarine cables, where the land ends usually have poorer heat conductivity than the part of the cable which is laid in the sea. At such local areas, the conductor temperature and thereby also the temperature of the insulation will be higher than in the rest of the cable, and when as mentioned, the maximum temperature of the cable is the determining factor, most part of the cable will be poorly utilized.

There have been suggested several remedies for reducing these drawbacks. One method which has been used, is to join together cables having different dimensions. When submarine cables are used, the cables on land have a larger cross-section than in the sea, the part of the cable laying in the sea being joined together with two cables on land. The joints are then placed in the sea. One of the disadvantages of this arrangement is that such joints usually represent a weak spot and an undesirable discontinuity of the insulation and of the protective layers. Such joints do moreover also represent more expensive cable installations. Furthermore, there is the drawback caused by the fact that the joint has lower heat conductivity than the rest of the cable.

An alternative method to overcome this problem is described in German Pat. No. 553,696. The conductor of the cable is here described to consist of a plurality of wires which are stranded or twisted in a normal manner. During manufacture of the cable, these wires are joined to a conductor having a larger filling factor, for example, a solid conductor having the same or substantially the same outer diameter. One of the conditions for obtaining an improvement of significance in this case is that the multiwire conductor is made concentrically in a normal manner from round wires or wire cross-sections which provide a filling factor that is still worse than for round wires. Thus, the disadvantage of joining during installation is eliminated, as the installation as well as the protecting layers may be manufactured continuously during the manufacturing process without the discontinuities which would be determined by the variations of the outer conductor diameter. This design, however, has little practical importance today, when cable dimensions are reduced as much as possible by making conductors with a large filling factor. This is done by compressing conductors built from circular wires by means of rolling processes, by building the conductor from profiled wires, or, as sometimes is the case with hollow conductors, by making the conductor from a perforated extruded pipe with one or more layers of profiled wires over the pipe. By joining such conductor types with solid conductors, there is no more than a reduction of heat production by more than 3% to 7%, while for a compressed concentric conductor built up of circular wires, an improvement of about 35% is obtained by joining it to a solid conductor having the same outer diameter.

A third method which has been suggested to reduce this problem is of great importance for cable having aluminum conductors. In this case, as described in U.S.

Pat. No. 3,666,879, issued May 30, 1972 and assigned to the same assignee as the instant application, copper conductors are joined to the aluminum conductors in such a manner that the transfer from aluminum to copper does not involve any change of the physical dimensions of the conductors. The parts of the cable comprising copper conductors will then be used at places having lower heat conductivity than for the rest of the cable, such as at the land ends of submarine cable, at ground cable joints and so on. This technique has, however, no practical advantages for cables having copper conductors, because material having better electrical conductance than copper, such as silver, is too expensive to use as conductor material in power cables. It is also known to change the outer diameter and length of conductors to compensate for temperature changes, as shown in U.S. Pat. No. 3,317,651, issued May 2, 1967. This provides further manufacturing and installation difficulties, however.

Hollow oil-filled conductors such as used for power cables, are particularly sensitive to temperature variations. A hollow conductor consists of a conductor with a duct centrally arranged. The duct may for instance be made from a helically wound metal tape or metal wire, upon which the conductor consisting of one or more layers of wires is wound. The helix constitutes a support for the conductor such that this will not collapse and destroy the duct. What is more common today is to have a hollow conductor built from profiled wires, which are wound such that the wires support each other, and so that the conductor does not collapse. An alternative is to have the conductor made from a continuous pipe which is perforated and over which there are arranged one or more layers of round or profiled wires.

A known method for increasing the oil flow velocity and obtaining turbulent flow to improve the heat transfer from a hollow conductor to the flowing oil is accomplished by inserting an helically shaped body in the duct, thereby forcing the oil to follow in the helically shaped duct with reduced cross-section and increased length. A disadvantage with this design is that the cross-section of the conductor is not increased, whereby the amount of heat due to heat losses will be substantially increased. The desired effect will therefore not always be obtained. A further disadvantage is that this method will be expensive in production. Furthermore, due to the extension of the inserted body, it will not be suitable for use in submarine cable portions.

SUMMARY OF THE INVENTION

It is therefore the primary object of the present invention to provide a more efficient cable having improved thermal characteristics with varying external conditions and which has a constant outer diameter.

This is achieved by utilizing a conductor having a larger cross-section without increasing the outer diameter of the conductor. The centrally arranged hollow or duct is partially filled with a conducting material constituting an integrated portion which is a continuation of the conductor. The cross-section of the conductor may be increased for the parts of the cable having less heat conductivity than the rest of the cable, by partially filling the duct with conductor material in such a manner that the inner diameter of the duct will be smaller at such locations, while the outer diameter is maintained constant along the whole length of the conductor. Preferably this is done during manufacturing, but in some cases it may also be of advantage to apply the insert or filling parts during installation, when it is necessary to increase the cross-section at the joints.

The above mentioned and other features and objects of the present invention will clearly appear from the following detailed description of embodiments of the invention, taken in conjunction with the drawings.

BRIEF DESCRIPTION OF THE DRAWINGS

FIGS. 1a, b and c schematically show one variation of the cable utilizing helices of varying inner diameters;

FIGS. 2a and b shows cross-section of a cable using a hollow inner perforated pipe;

FIGS. 3a, b and c and show a cross-section using an inner profiled wire layer; and FIGS. 4a and b show a cross-section using a segmental arrangement of outer conductors.

DESCRIPTION OF THE PREFERRED EMBODIMENTS

FIG. 1a shows a design where A represents the main length of conductor and B represents the reinforced area of the conductor. The inner diameter of part B is graded in order to smooth the transfer from large to small cross-sections and vice versa. The ducts 1, 11, 21, 31 are obtained by means of helices 2, 12, 22, 32 wound from a tape of a metallic material such as steel, aluminum or the like. It may be also possible to use any kind of material having suitable mechanical and other physical properties. In the example shown, the main conductor 3 is made of three layers of round wires wound partly over a helix 2 and partly over the reinforced part of the conductor which also consists of three layers of round conductors 13, 23, 33 wound over helices forming smaller ducts than the duct of the main conductor. The helix 2 is ended just before the conductor wires 13 start and there is a corresponding arrangement for the helices 12 and 22. The cross-section of the conductor is thus increased or decreased gradually, and this will appear from sections cut through the conductors at a, b, c, and d. Cross-sections a—a and d—d are indicated in FIGS. 1b and c. The conductors may of course also be made up of profiled wires or a combination of round and profiled wires.

FIGS. 2a and b show a conductor with ducts 1', 11' constituted by perforated pipes 2', 12', while the main conductors 3' consists of one layer of profiled wires in addition to the perforated pipe which in this case may be a part of the conductor. The reinforced part of the conductor 13' in this example consists of one layer of profiled wires. In this case the wires may also have any shape suitable for this type of cable, depending or whether it is desirable to reduce or increase the outer diameter of the conductor in order to obtain suitable voltage grading or suitably dimensioned cable diameters, relative to the cable load, length and so on.

FIGS. 3a, b and c show a conductor design where the ducts 1'', 11'', 21'' are constituted by profiled wires 3'', 13'', 23'', in this case also called key stone shaped wires, which are stranded in such a manner that it is self-supported.

FIGS. 4a and b show shows a design where the conductor is constituted by segments, each being produced from a certain number of wires, which are stranded and rolled into a segmental shape, known as a Milliken conductor. In this case the ducts 1''', 11''' are obtained by helices 2''', 12''' as shown, or the conductor may be self-supported such that the duct is automatically formed during stranding of the segments into a complete conductor. In this design, each of the segments in the reinforced conductor may be joined to individual segments in the main conductor in such a manner that the main length of conductor and the reinforced part of the conductor have the same outer diameter.

Manufacturing of the cable according to the present invention may be performed as follows. When both ends of a submarine cable are to be reinforced to reduce the heat production of the parts of the cable which are to be laid on land, the two parts of the conductor consituting the reinforcement of the cross-section with reduced ducts may be manufactured by first applying one or more wire layers over the reduced duct, with a diameter over the outer wire layer which is equal to the inner diameter of the main conductor to be laid in the sea. In a second operation the desired number of wires constituting the main conductor may first be wound over one of the reinforcements, whereupon the manufacturing of the main conductor is continued until it is wound over the other reinforcement at the other end. The manufacturing process may, alternatively be performed in one operation if the machinery is suitable for this cable design.

In cases where the filling part consist of several layers, it will be of advantage to use a graded insertion of these layers as shown in FIGS. 1a, b and c and FIGS. 2a and b in order to prevent a rapid change in the cross-section and of the cable bending properties.

A further advantage of the invention is obtained if the cable has forced cooling or if the temperature along the cable is to be equalized by circulating oil in the cable duct via a heat exchange. In such cases, the velocity of the oil in the duct will usually be such that the oil flow is laminar to have as low pressure variation as possible at variations in the load. When, however, the oil passes the smaller cross-section duct, the velocity will increase and the heat transfer from the conductor to the oil will be improved. By suitable selection of the duct diameter and cross-section, the oil flow, in the parts of the cable where the duct diameter is reduced by increasing the cross-section of the conductor, is made turbulent whereby the heat transfer is increased to a larger extent. In this manner the temperature along the cable will be further equalized and there is obtained improved utilization of the conductor materials.

It is admitted that the variation in pressure will increase at places where the duct is constricted. The extension of such constrictions in the longitudinal direction of the cable, however, is very short relative to the full cable length. The extension in connection with a joint will usually be of the order of 2–6 meters dependent upon the voltages and the design in general, while a manufacturing length usually will be a couple of hundred meters. The extra variation in pressure due to the constrictions will then be of negligible importance.

In order to obtain the best possible conductance between the main conductor and the filling part, the individual components, such as the wires of the main conductor and/or the filling part may be tinned or silver plated. When considering the main conductor, it is sufficient that the inner layer, or part which is in direct contact with the filling part, is provided with a thin layer of tin or silver.

The present invention is particularly suitable for single conductor oil-filled cables with conductors of copper. It may, however, also be used for hollow conductors for other types of cables of the oil-filled type or other types of cables having other conductor materials.

What is claimed is:

1. A power cable having varying thermal conditions along a route comprising a plurality of outer longitudinal electrical wire conductors disposed about a hollow central duct, said conductors having a substantially constant outer diameter along the route, said duct and conductors having an inner diameter which increases and decreases with the thermal conditions along said route, and said conductors having a cross-sectional dimension between inner and outer diameters which correspondingly increases and decreases therewith.

2. The device of claim 1 wherein said inner diameter is reduced to provide an enlarged conductor cross-section in areas of poor heat conductivity relative to other areas of the cable route.

3. The device of claim 2 wherein said enlarged conductor cross-section is integral with and of the same material as the conductors in said other areas.

4. The device of claim 2 wherein said enlarged conductor cross-section areas taper gradually into said other areas.

5. The device of claim 2 wherein said elarged conductor cross-section areas have an inner conductor of a material different from said outer conductors.

6. The device of claim 5 wherein said inner conductor is a helically wound tape of varying inner diameter providing said hollow duct and said outer conductors include a plurality of layers of varying inner diameter.

7. The device of claim 5 wherein said inner conductor is a hollow pipe of varying diameter.

8. The device of claim 7 wherein said outer conductors include a plurality of layers of wires having a profiled shape.

9. The device of claim 2 wherein said conductors include a plurality of layers of profiled shape wires.

* * * * *